United States Patent

Brüggendick

[11] Patent Number: 5,824,139
[45] Date of Patent: Oct. 20, 1998

[54] ADSORBER FOR PURIFYING COMBUSTION GASES

[75] Inventor: Hermann Brüggendick, Schermbeck, Germany

[73] Assignee: STEAG Aktiengesellschaft, Essen, Germany

[21] Appl. No.: 849,547

[22] PCT Filed: Oct. 11, 1995

[86] PCT No.: PCT/EP95/03996

§ 371 Date: May 14, 1997

§ 102(e) Date: May 14, 1997

[87] PCT Pub. No.: WO96/14918

PCT Pub. Date: May 23, 1996

[30] Foreign Application Priority Data

Nov. 14, 1994 [DE] Germany .......................... 44 40 584.7

[51] Int. Cl.⁶ .............................................. B01D 53/02
[52] U.S. Cl. ................... 96/109; 96/138; 96/139; 96/141; 96/143; 96/151; 96/152; 422/177; 422/213; 422/219; 422/220; 422/239
[58] Field of Search ............................ 96/109, 123, 130, 96/138–141, 143, 150–152; 422/171, 177, 191, 213, 219, 220, 232, 239, 311

[56] References Cited

U.S. PATENT DOCUMENTS

| | | | |
|---|---|---|---|
| 1,823,895 | 9/1931 | Gray ....................................... | 96/150 X |
| 2,080,578 | 5/1937 | Ray ........................................... | 96/130 |
| 4,095,965 | 6/1978 | Neumann et al. ........................ | 96/109 |
| 4,324,570 | 4/1982 | Pforr et al. ........................... | 422/177 X |
| 4,354,862 | 10/1982 | Sgaslik .................................. | 96/130 X |
| 4,960,447 | 10/1990 | Brüggendick et al. ................... | 55/390 |
| 5,165,900 | 11/1992 | Miksitz ................................... | 96/150 X |
| 5,344,616 | 9/1994 | Bruggendick .......................... | 96/138 X |
| 5,356,462 | 10/1994 | Brüggendick .......................... | 96/123 X |
| 5,494,500 | 2/1996 | Ikenaga et al. ........................... | 96/109 |
| 5,527,514 | 6/1996 | Watanabe et al. .................... | 96/123 X |

FOREIGN PATENT DOCUMENTS

| | | | |
|---|---|---|---|
| 0225475 | 6/1987 | European Pat. Off. . | |
| 3402764 | 12/1984 | Germany . | |
| 3817685 | 11/1989 | Germany . | |
| 9014347 | 2/1991 | Germany . | |
| 4126146 | 4/1992 | Germany . | |
| 4220493 | 1/1994 | Germany ................................ | 96/143 |
| 52-072373 | 6/1977 | Japan ...................................... | 96/130 |
| 53-043680 | 4/1978 | Japan ...................................... | 96/130 |
| 0747512 | 7/1980 | U.S.S.R. ................................. | 96/143 |
| 1159602 | 6/1985 | U.S.S.R. ................................. | 96/143 |
| 0901923 | 7/1962 | United Kingdom .................... | 96/150 |

*Primary Examiner*—Robert Spitzer
*Attorney, Agent, or Firm*—Robert W. Becker & Associates

[57] ABSTRACT

An adsorber for purifying flue gases of a furnace includes a housing having a flue gas inlet and a flue gas outlet. The housing has an adsorption medium chamber. A fill socket extends from the top of the housing. A removal device extends from the bottom of the housing. The chamber includes substantially vertical, gas-permeable walls for delimiting the chamber at the inlet side and at the outlet side. The chamber also includes a vertical gas-permeable partition and a slanted non-gas-permeable wall. The wall at the inlet side is a louver wall extending upwardly to the level of the fill socket. The wall at the outlet side is a slotted screen connected with the slanted, non-gas-permeable wall to the fill socket. The flue gas outlet is located opposite the non-gas-permeable wall.

9 Claims, 2 Drawing Sheets

ADSORBER FOR PURIFYING COMBUSTION GASES

BACKGROUND OF THE INVENTION

The invention relates to an adsorber for cleaning flue gases of a furnace, comprising a housing having a flue gas inlet and a flue gas outlet and further comprising an adsorption medium chamber arranged in the housing and having a fill socket extending upwardly from the top of the housing and a removal device extending downwardly from the bottom of the housing, wherein the chamber is delimited at the inlet side and at the outlet side by substantially vertical, gas-permeable walls and comprises a substantially vertical, gas-permeable partition and wherein the wall at the inlet side is a louver wall and extends upwardly to the level of the fill socket.

Such adsorbers, known from practice, have been used in the past in connection with power plants and large garbage incinerating facilities. The resulting considerable gas throughput requires a great constructive expenditure. Thus, an application in connection with furnaces of smaller output has been proven to be uneconomical.

It is an object of the present invention, to provide an adsorber of the aforementioned kind that can be used in a simple and economical manner also in connection with furnaces of a smaller output.

SUMMARY OF THE INVENTION

As a solution to this object, the adsorber according to the present invention is characterized in that the gas-permeable wall at the inlet side of the adsorption medium chamber is a lower wall and extends upwardly to the level of the fill socket, while the wall at the outlet side is a slotted screen connected with a slanted, non-gas-permeable wall to the fill socket whereby the flue gas outlet is located opposite the non-gas-permeable wall.

The inventive adsorber for purifying flue gases of a furnace is characterized by:

a housing having a flue gas inlet and a flue gas outlet;

the housing comprising an adsorption medium chamber;

a fill socket extending from a top of the housing;

a removal device extending from a bottom of the housing;

the chamber comprising substantially vertical, gas-permeable walls for delimiting the chamber at the inlet side and at the outlet side;

the chamber further comprising a vertical gas-permeable partition and a slanted non-gas-permeable wall;

the wall at the inlet side being a louver wall extending upwardly to a level of the fill socket;

the wall at the outlet side being a slotted screen connected with the slanted, non-gas-permeable wall to the fill socket, wherein the flue gas outlet is located opposite the slanted non-gas-permeable wall.

The flue gas inlet is guided into the housing at an upper portion thereof, and between the flue gas inlet and the louver wall a baffle plate is arranged.

The baffle plate extends to an upper end of the housing.

The vertical gas-permeable partition is a wall with holes.

The adsorber further comprises a removable adsorption medium filling container detachably connected to the fill socket.

The adsorber further comprises a filling sensor connected to the fill socket, wherein the fill socket comprises a closure device controlled by the sensor.

The filling container comprises a closure device at an outlet side thereof.

The adsorber further comprises a removable adsorption medium removal container, wherein the removal device has a removal funnel that comprises a closure device and is detachably connected to the removable adsorption medium removal container.

The removal container comprises a closure device at an inlet side thereof.

The louver wall at the inlet side ensures a very uniform distribution of the flue gases to be cleaned across the height of the adsorption medium chamber. The louver wall extends to the level of the inlet socket whereby the flue gases at this location can also enter between the louver wall and the fill socket into the adsorption medium bed. They are guided at a slant downwardly through the upper portion of the bed by the oppositely arranged slanted non-gas-permeable wall. This area thus provides optimal flow conditions, so that no overheated zones will result, without requiring additional inserts. The slotted screen at the outlet side is of an extremely simple construction. The purified flue gases are guided downstream of the slotted screen in an upward direction to the flue gas outlet. A direct impact of the flue gas outlet is prevented by the slanted, non-gas-permeable wall which extends between the slotted screen and the fill socket.

The simple and space-saving construction of the adsorber which however ensures a very good purifying action for the flue gasses allows its application in connection with small, decentralized and optionally even non-stationary furnaces. A preferred application field is the combustion of hospital refuse material. Such devices can also be used to combust the refuse of doctor's offices.

Depending on the local density of the users and depending on their needs, the devices are movable in order to be transported according to schedule to a different location or they are stationarily installed in areas with high population density, respectively, adjacent to large hospitals. Of course, it is also possible to make accessible a device belonging to a hospital to the doctors in private practice in the vicinity of the hospital for shared use.

In a further embodiment of the invention it is suggested that the flue gas inlet at the upper area of the housing penetrates into it and that between the flue gas inlet and the louver wall a baffle plate is arranged. This additionally prevents short circuit flow in the upper area of the reactor bed especially when the baffle plate extends to the upper end of the housing.

The partition is advantageously a wall with holes and is thus of a simple construction.

In a further embodiment of the invention it is suggested that a removable adsorption medium filling container is detachably connected to the fill socket. For known moving bed reactors the filing action is, in general, performed with a continuously working supply system which is a fixed component of the already complicated installation. The suggested detachable container provides for a much simpler manipulation. As soon as it is empty, it is removed from the absorber, is filled on the floor, and repositioned onto the adsorber. This only requires a simple lifting device instead of a complex supply system.

It is especially advantageous in this context that the fill socket is provided with a filling sensor and has a closure device controlled by the sensor. The filling sensor responds when the inflow of reaction medium has stopped and no reaction medium is present within the fill socket. This indicates that the filling container is empty. Subsequently, the fill socket is automatically closed. A gas escape via the fill socket into the atmosphere is thus prevented. At the same time, the removal device at the lower end of the chamber is shut down. Furthermore, the filling sensor can generate a signal with which a new filling of the filling container, respectively, its exchange for a new filling container is activated.

According to a further advantageous feature, the filling container at its outlet side is provided with a closure device which ensures unimpeded transport of the filled filling container.

Advantageously, the removal device comprises a removal funnel which has a closure device and which is connected with a removable adsorption medium removal container in a detachable manner. This also simplifies the construction in comparison to known devices. The latter operate with continuous supply means in order to remove the expanded adsorption medium, in general, activated carbon, to the furnace. In contrast, it is only necessary to detach the suggested removal container from the adsorber and to guide it to the furnace. For simplifying the transport of the removal container, it is advantageous to provide it at its inlet side with a closure device.

Included in the gist of the invention are also such combinations or subcombinations of the inventive features which deviate from the attached claims.

BRIEF DESCRIPTION OF THE DRAWINGS

The invention will be explained in the following with the aid of preferred embodiments in connection with the attached drawings. The drawings show in.

DESCRIPTION OF PREFERRED EMBODIMENTS

Figure 1:
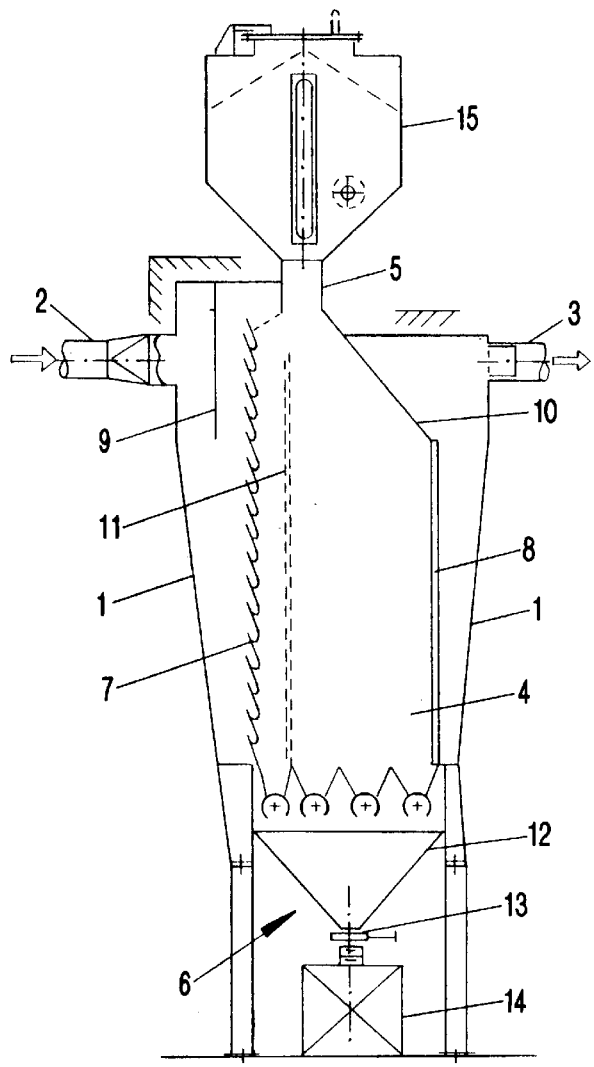
FIG. 1 a schematic section of the inventive adsorber.

According to FIG. 1 the absorber comprises a housing 1 which is provided with a flue gas inlet 2 and a flue gas outlet 3. In the interior of the housing 1 an adsorption medium chamber 4 is provided which has a fill socket 5 extending from the top of the housing and a removal device 6 extending from the bottom of the housing. At the inlet side the chamber 4 is delimited by a louver wall 7 and at the outlet side by a slotted screen 8.

The louver wall 7 extends to the level of the fill socket 5. In this area the flue gas inlet 2 opens. Between it and the louver wall 7 a baffle plate 9 is arranged which extends to the upper wall of the housing 1. In this manner a very favorable distribution of the flue gases to be cleaned over the height of the chamber 4 is provided. The baffle plate 9 prevents too great a loading of the upper reactor area. On the other hand, gas flow into this area is not interrupted because the louver wall 7 extends to the level of the fill socket 5 and delimits together with it the free inlet opening.

The flue gas entering the chamber in the upper area is guided by a non-gas-permeable wall 10 at a slant in the downward direction onto the slotted screen 8. A short circuit flow to the oppositely arranged flue gas outlet 3 is thus prevented. The flow through the upper area of the reactor bed is intensive and uniform so that overheated zones are prevented without requiring special inserts. The slotted screen 8 is of a simple construction. The same holds true for the substantially vertically extending sheet metal wall 11 with holes which divides the reactor bed into two material paths.

The adsorber is a component of a device for combusting hospital refuse and refuse of doctor's practices. The throughput of flue gases to be cleaned is thus relatively limited.

As can be seen from FIG. 1, the removal device 6 comprises a removal funnel 12 which is provided with a closure device 13. Below the removal funnel 12 an adsorption medium removal container 14 is positioned. This can be detached from the removal funnel 12 and removed from the adsorber in order to supply the adsorption medium, in general activated carbon, to the furnace. This type of transport is simpler with respect to the technological expenditures than a continuously operating conveying device. The removal container 14 comprises at its inlet side a non-represented closure device.

Figure 2:
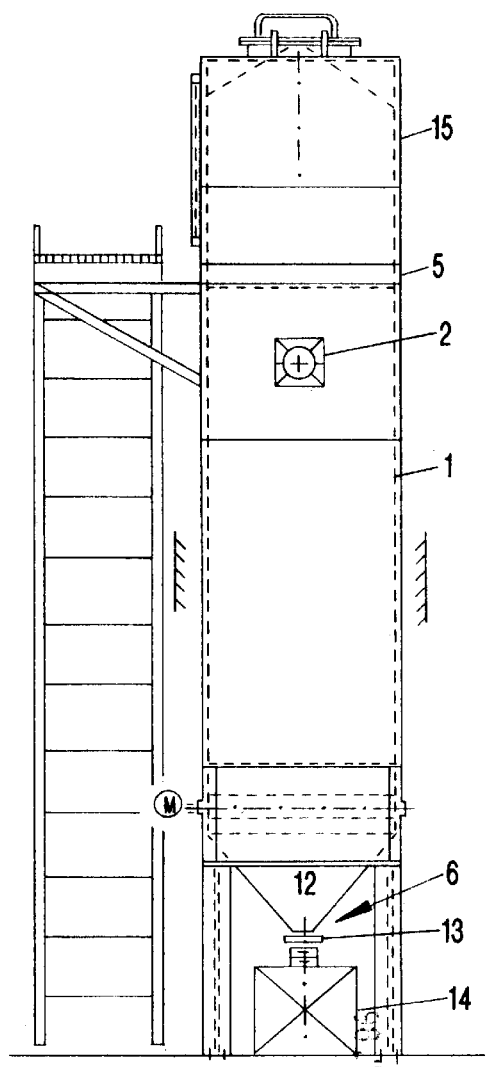
FIG. 2 a side view of the adsorber, viewed from the left in FIG. 1.

From FIG. 2 it is obvious that the fill socket 5 in the horizontal direction extends over the full width of the adsorber. It forms a gap to which is connected at the outlet side the slanted wall 10. At the inlet side the loading area of the chamber 4 is gas permeable.

To the fill socket 5 an adsorption medium filling container 15 is fixedly connected. A non-represented supplying device serves to load the filling container 15 continuously or batch-wise with adsorption medium.

Figure 3:
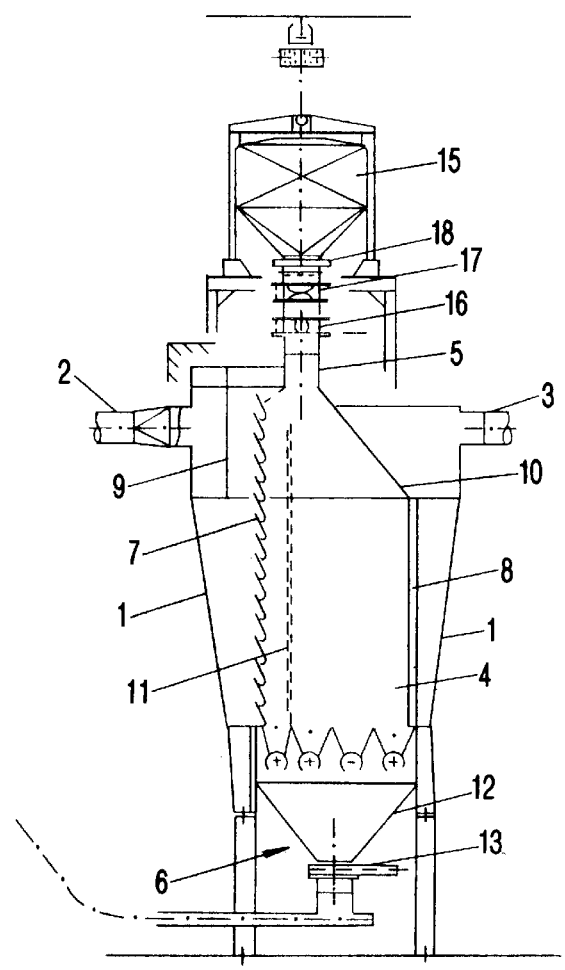
FIG. 3 a section according to FIG. 1 of a different embodiment.
Figure 4:
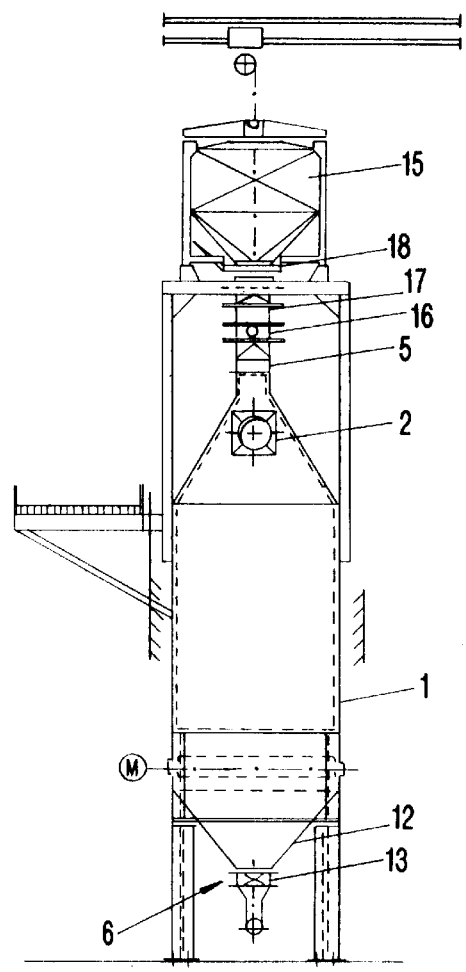
FIG. 4 a side view of the different absorber viewed from the left in FIG. 3.

The embodiment according to FIGS. 3 and 4 differs from the one of FIGS. 1 and 2 primarily in that the adsorption medium filling container 15 is connected detachably to the fill socket 5. The filling container can thus be filled on the floor with adsorption medium and can then be placed onto the fill socket 5 in order to be connected therewith. This is substantially simpler than a continuously operating supplying device that is used primarily in connection with large size adsorbers.

FIG. 3 shows that the fill socket 5 is provided with a filling sensor 16. It controls a closure device 17 arranged at the fill socket 5. The filling sensor 16 responds as soon as no adsorption medium is present in the fill socket 5. This means that the filling container 15 is empty. Subsequently, the closure device 17 is automatically closed so that no flue gases can escape through the fill socket 5 into the filling container 15 and via it into the atmosphere. At the same time, the removal device 6 is shut down so that no emptying of the chamber 4 takes place. The filling container 15 is removed, filled again at the floor, and then placed onto the fill socket 5 or is exchanged for a freshly filled filling container. The filling container 15 comprises a closure device 18. The latter is opened for restarting operation whereby subsequently the opening of the closure device 17 takes place. As soon as subsequently the filling sensor 16 detects the presence of adsorption medium, the removal device 6 is again activated.

In the embodiment according to FIGS. 3 and 4, a removal container 14 is obsolete. The removal funnel 12 instead is connected to a schematically shown conveying device which moves the spent activated carbon directly to the furnace.

FIG. 4 shows that the fill socket 5 forms a central tube which allows for a point-directed loading of the chamber 4 with adsorption medium. The loading area of the chamber 4 is funnel-shaped whereby the funnel at the inflow side is permeable for the flue gases. In the present case, no additional inserts are required in order to produce optimal conditions within the filling area.

Other embodiments are within the gist of the invention. For example, instead of a single partition a plurality of partitions can be arranged within the chamber 4. Furthermore, it is possible to provide the removal device, which in the FIG. 1 includes a plurality of removal gates, can be provided with a single gate at the removal funnel whereby the latter is then directly connected to the housing.

The present invention is, of course, in no way restricted to the specific disclosure of the specification and drawings, but also encompasses any modifications within the scope of the appended claims.

What I claim is:

1. An adsorber for purifying flue gases of a furnace, said adsorber comprising:

a housing having a flue gas inlet and a flue gas outlet;

said housing comprising an adsorption medium chamber;

a fill socket extending from a top of said housing;

a removal device extending from a bottom of said housing;

said chamber comprising substantially vertical, gas-permeable walls for delimiting said chamber at said inlet side and at said outlet side;

said chamber further comprising a vertical gas-permeable partition and a slanted non-gas-permeable wall;

said wall at said inlet side being a louver wall extending upwardly to a level of said fill socket;

said wall at said outlet side being a slotted screen connected with said slanted, non-gas-permeable wall to said fill socket, wherein said flue gas outlet is located opposite said non-gas-permeable wall.

2. An adsorber according to claim 1, wherein said flue gas inlet is guided into said housing at an upper portion thereof and wherein between said flue gas inlet and said louver wall a baffle plate is arranged.

3. An adsorber according to claim 1, wherein said baffle plate extends to an upper end of said housing.

4. An adsorber according to claim 1, wherein said vertical gas-permeable partition is a wall with holes.

5. An adsorber according to claim 1, further comprising a removable adsorption medium filling container detachably connected to said fill socket.

6. An adsorber according to claim 5, further comprising a filling sensor connected to said fill socket, wherein said fill socket comprises a closure device controlled by said sensor.

7. An adsorber according to claim 5, wherein said filling container comprises a closure device at an outlet side thereof.

8. An adsorber according to claim 1, further comprising a removable adsorption medium removal container, wherein said removal device has a removal funnel that comprises a closure device and is detachably connected to said removable adsorption medium removal container.

9. An adsorber according to claim 8, wherein said removal container comprises a closure device at an inlet side thereof.

* * * * *